US008478697B2

(12) United States Patent
Agarwal

(10) Patent No.: US 8,478,697 B2
(45) Date of Patent: Jul. 2, 2013

(54) DETERMINING WHETHER TO PROVIDE AN ADVERTISEMENT TO A USER OF A SOCIAL NETWORK

(75) Inventor: Deepak K. Agarwal, Sunnyvale, CA (US)

(73) Assignee: Yahoo! Inc., Sunnyvale, CA (US)

( * ) Notice: Subject to any disclaimer, the term of this patent is extended or adjusted under 35 U.S.C. 154(b) by 313 days.

(21) Appl. No.: 12/882,599

(22) Filed: Sep. 15, 2010

(65) Prior Publication Data
US 2012/0066053 A1 Mar. 15, 2012

(51) Int. Cl.
G06Q 99/00 (2006.01)
G06Q 30/00 (2012.01)

(52) U.S. Cl.
USPC ........................................ 705/319; 705/14.4

(58) Field of Classification Search
None
See application file for complete search history.

(56) References Cited

U.S. PATENT DOCUMENTS

| | | | | |
|---|---|---|---|---|
| 2002/0123928 A1* | 9/2002 | Eldering et al. | ................ | 705/14 |
| 2004/0204983 A1* | 10/2004 | Shen et al. | ....................... | 705/10 |
| 2005/0278443 A1* | 12/2005 | Winner et al. | ................ | 709/224 |
| 2008/0140506 A1* | 6/2008 | Christianson et al. | .......... | 705/10 |
| 2010/0057560 A1* | 3/2010 | Skudlark et al. | ........... | 705/14.49 |
| 2010/0145771 A1* | 6/2010 | Fligler et al. | .................... | 705/10 |
| 2010/0257023 A1* | 10/2010 | Kendall et al. | .................. | 705/10 |
| 2010/0324990 A1* | 12/2010 | D'Angelo et al. | ......... | 705/14.46 |
| 2011/0047035 A1* | 2/2011 | Gidwani et al. | ........... | 705/14.73 |
| 2011/0106580 A1* | 5/2011 | Almeida et al. | ............. | 705/7.29 |
| 2011/0264522 A1* | 10/2011 | Chan et al. | ................. | 705/14.52 |
| 2011/0314098 A1* | 12/2011 | Farrell et al. | ................. | 709/204 |

OTHER PUBLICATIONS

Social Networks and Collective Action: A Theory of the Critical Mass. III, Gerald Marwell and Pamela E. Oliver, University of Wisconsin-Madison, Ralph Prahl—Public Service Commission of Wisconsin.*

* cited by examiner

*Primary Examiner* — Matthew T Sittner
(74) *Attorney, Agent, or Firm* — Brinks Hofer Gilson & Lione

(57) ABSTRACT

Techniques are described herein for determining whether to provide an advertisement to a user of a social network. The determination is based on a click probability and a social network value for the user. The click probability indicates a likelihood of the user to select the advertisement if provided to the user via the social network. The social network value is based on a subscription probability of the user and further based on subscription probabilities of other users in the social network that are included in an affinity set of the user. Each subscription probability indicates a likelihood of a respective user to subscribe to a paid service with respect to the social network.

20 Claims, 8 Drawing Sheets

```
                    ┌─ 202
                    │
         ┌──────────────────────────────────────────────┐
         │ DETERMINE CLICK PROBABILITY FOR FIRST USER OF SOCIAL NETWORK │
         └──────────────────────────────────────────────┘
                            │
                            ▼
     ┌─ 204
     │
     ┌──────────────────────────────────────────────────┐
     │ DETERMINE PLURALITY OF SUBSCRIPTION PROBABILITIES FOR │
     │   PLURALITY OF RESPECTIVE USERS OF SOCIAL NETWORK │
     └──────────────────────────────────────────────────┘
                            │
                            ▼
  ┌─ 206
  │
  ┌──────────────────────────────────────────────────┐
  │ DETERMINE SOCIAL NETWORK VALUE OF FIRST USER BASED ON │
  │      PLURALITY OF SUBSCRIPTION PROBABILITIES     │
  └──────────────────────────────────────────────────┘
                            │
                            ▼
  ┌─ 208
  │
  ┌──────────────────────────────────────────────────┐
  │  DETERMINE WHETHER TO PROVIDE FIRST ADVERTISEMENT │
  │     TO FIRST USER BASED ON CLICK PROBABILITY     │
  │            AND SOCIAL NETWORK VALUE              │
  └──────────────────────────────────────────────────┘
```

FIG. 2

DETERMINING WHETHER TO PROVIDE AN ADVERTISEMENT TO A USER OF A SOCIAL NETWORK

BACKGROUND OF THE INVENTION

1. Field of the Invention

The present invention relates to providing advertising to users of social networks.

2. Background

A computer-based social network ("social network") is a network that enables its users to create and maintain social relations with other users with whom they may share similar interests, beliefs, relationships, activities, or the like. A social network typically provides a representation of each user (often a profile page), his/her social links, and any of a variety of additional services. Most social networks are web-based and enable users to interact via the internet. For instance, users may post comments on their own profile pages and/or other users' profile pages, use e-mail and/or instant messaging, and so on. Some examples of web-based social networks include Facebook®, MySpace®, Twitter®, LinkedIn®, Xing®, Doostang®, and Academy®.

Specifically, social networks enable a user to interact with other users who are members of an affinity set of the user. Such other users are often referred to as "connections" of the user. For example, an affinity set may be any group of persons, including a group of friends, business associates, players of a massively multiplayer online game, persons with a common interest, all users of a social network, application ("app"), or web site, or a subgroup thereof. A user may belong to any number of affinity sets. Members of a social network may be able to search for other users in his or her affinity set, or outside the affinity set, by their names or other characteristics of the users, such as a designated interest, location, or job position.

Some social networks offer paid services to their users. For example, a business-oriented social network, such as LinkedIn®, may offer a paid service in accordance with which a user is provided information about other users who have performed a search for that user. The user may desire such information, for example, if the user is searching for a job or if the user is attempting to develop new business.

A social network may also provide advertisements to its users. Such advertisements may provide substantial revenue for the social network. Thus, the social network may attempt to maximize profits by providing aggressive advertising campaigns to its users. However, indiscriminately providing advertisements to all of the social network's users may negatively impact the users' experience. If a user has a negative experience, he or she may leave the social network altogether. Such departure of a user may be more damaging in the long run than the revenue gained from indiscriminately providing aggressive advertising to all users of the social network.

BRIEF SUMMARY OF THE INVENTION

Various approaches are described herein for, among other things, determining whether to provide an advertisement to a user of a social network. The determination is based on a click probability and a social network value for the user. The click probability indicates a likelihood of the user to select the advertisement if the advertisement is provided to the user via the social network. The social network value is based on a subscription probability of the user and further based on subscription probabilities of other users in the social network that are included in an affinity set of the user. Each subscription probability indicates a likelihood of a respective user to subscribe to a paid service with respect to the social network.

An example method of determining whether to provide an advertisement is described. In accordance with this example method, a click probability for a first user of a social network is determined. The click probability indicates a likelihood of the first user to select a first advertisement if the first advertisement is provided to the first user via the social network. A plurality of subscription probabilities is determined for a plurality of respective users of the social network. The plurality of users includes the first user and second users that are included in an affinity set of the first user. Each subscription probability indicates a likelihood of a respective user of the plurality of users to subscribe to a paid service with respect to the social network. A social network value is determined for the first user based on the plurality of subscription probabilities. A determination is made whether to provide the first advertisement to the first user based on the click probability and the social network value.

An example system is described that includes a click probability module, a subscription probability module, a network value module, and a provision determination module. The click probability module is configured to determine a click probability for a first user of a social network. The click probability indicates a likelihood of the first user to select a first advertisement if the first advertisement is provided to the user via the social network. The subscription probability module is configured to determine a plurality of subscription probabilities for a plurality of respective users of the social network. The plurality of users includes the first user and second users that are included in an affinity set of the first user. Each subscription probability indicates a likelihood of a respective user of the plurality of users to subscribe to a paid service with respect to the social network. A network value module is configured to determine a social network value for the first user based on the plurality of subscription probabilities. A provision determination module is configured to determine whether to provide the first advertisement to the first user based on the click probability and the social network value.

An example computer program product is described that includes a computer-readable medium having computer program logic recorded thereon for enabling a processor-based system to determine whether to provide an advertisement to a user of a social network. The computer program logic includes first, second, third, and fourth program logic modules. The first program logic module is for enabling the processor-based system to determine a click probability for a first user of a social network. The click probability indicates a likelihood of the first user to select a first advertisement if the first advertisement is provided to the first user via the social network. The second program logic module is for enabling the processor-based system to determine a plurality of subscription probabilities for a plurality of respective users of the social network. The plurality of users includes the first user and second users that are included in an affinity set of the first user. Each subscription probability indicates a likelihood of a respective user of the plurality of users to subscribe to a paid service with respect to the social network. The third program logic module is for enabling the processor-based system to determine a social network value for the first user based on the plurality of subscription probabilities. The fourth program logic module is for enabling the processor-based system to determine whether to provide the first advertisement to the first user based on the click probability and the social network value.

Further features and advantages of the disclosed technologies, as well as the structure and operation of various embodiments, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

FIG. 2 depicts a flowchart of an example method for determining whether to provide an advertisement to a user of a social network in accordance with an embodiment described herein.

Figure 1:
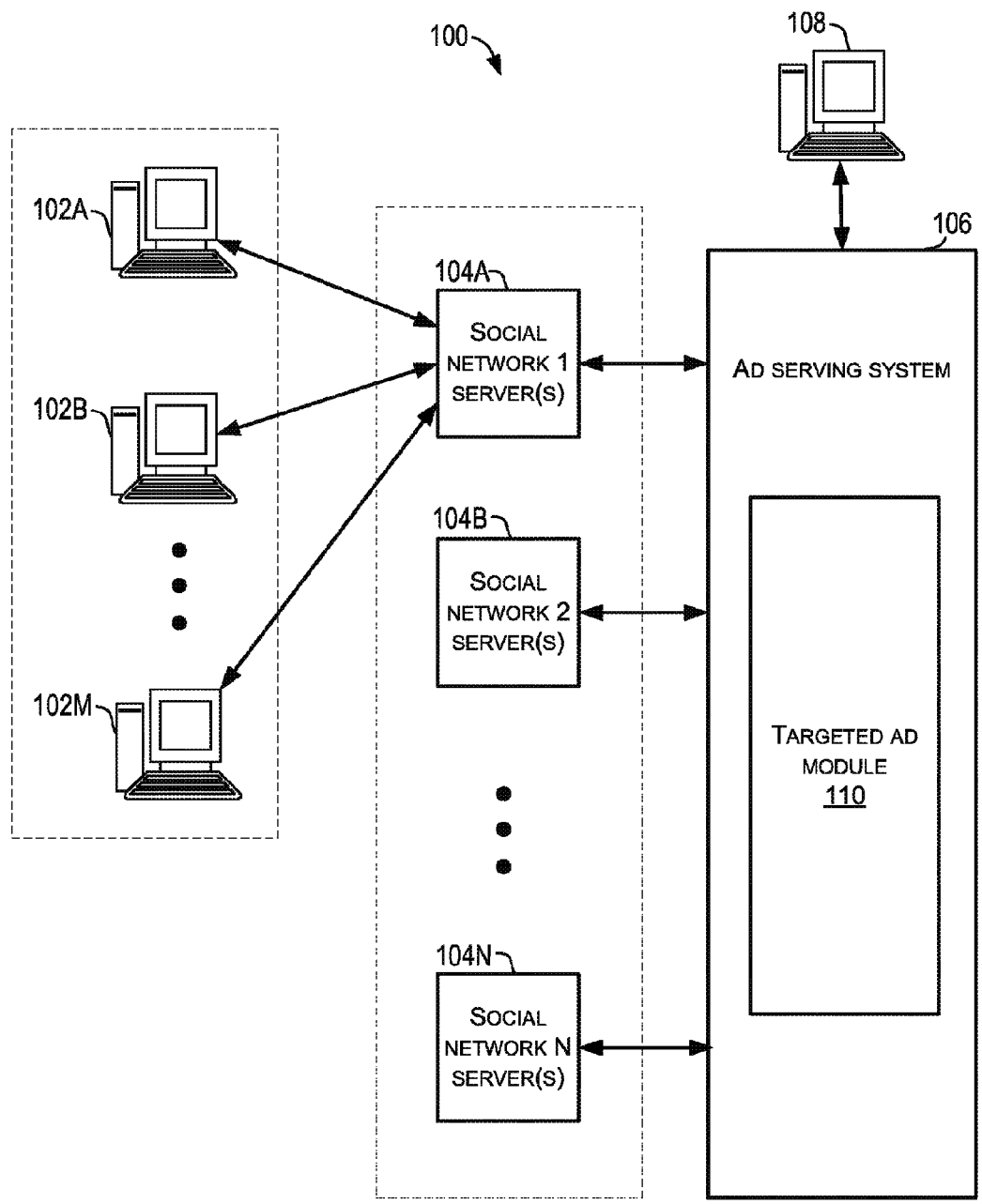
FIG. 1 is a block diagram of an example display advertisement ("ad") network in accordance with an embodiment described herein.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

I. Introduction

The following detailed description refers to the accompanying drawings that illustrate example embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the art to implement such feature, structure, or characteristic in connection with other embodiments whether or not explicitly described.

Example embodiments are capable of determining whether to provide an advertisement to a user of a social network. The determination is based on a click probability and a social network value for the user. The click probability indicates a likelihood of the user to select the advertisement if the advertisement is provided to the user via the social network. The social network value is based on a subscription probability of the user and further based on subscription probabilities of other users in the social network that are included in an affinity set of the user. Each subscription probability indicates a likelihood of a respective user to subscribe to a paid service with respect to the social network.

Techniques described herein have a variety of benefits as compared to conventional techniques for providing advertising to users of social networks. For example, by determining whether to provide an advertisement to a user of a social network based on the user's social network value, care may be taken to manage (e.g., minimize) a negative impact to an experience of the user with respect to use of the social network. For instance, an ad that could have a negative impact on an experience of a user who has a high social network value may not be shown to that user. However, the same ad may be shown to a user who has a lesser social network value. Accordingly, techniques described herein may increase (e.g., maximize) the revenue of a social network with respect to showing ads to its members, while managing (e.g., minimizing) negative impacts of showing higher risk (e.g., more aggressive) ads to its high-profile members (i.e., users with relatively high importance in the social network).

II. Example Embodiments for Determining Whether to Provide an Advertisement

FIG. 1 is a block diagram of an example display advertisement ("ad") network in accordance with an embodiment described herein. Generally speaking, display ad network 100 operates to serve advertisements (e.g., display ads) provided by advertisers to sites (e.g., social network sites) published by social network providers when such sites are accessed by certain users of the display ad network, thereby delivering the advertisements to the users. As shown in FIG. 1, display ad network 100 includes a plurality of user systems 102A-102M, a plurality of social network servers 104A-104N, an ad serving system 106, and at least one advertiser system 108. Communication among user systems 102A-102M, social network servers 104A-104N, ad serving system 106, and advertiser system 108 is carried out over a network using well-known network communication protocols. The network may be a wide-area network (e.g., the Internet), a local area network (LAN), another type of network, or a combination thereof. Although embodiments are described herein with reference to display ads for illustrative purposes, the embodiments are not limited in this respect. Instead, display ad network 100 may provide other types of advertisements in addition to, or in lieu of, display ads. For example, display ad network 100 may be capable of serving banner ads, video ads, pop-up ads, mobile ads, floating ads, and/or other types of advertisements.

User systems 102A-102M are computers or other processing systems, each including one or more processors, that are capable of communicating with any one or more of social network servers 104A-104N. For example, each of user systems 102A-102M may include a client that enables a user who owns (or otherwise has access to) the user system to access sites (e.g., Web sites) that are hosted by social network servers 104A-104N. For instance, a client may be a Web crawler, a Web browser, a non-Web-enabled client, or any other suitable type of client. By way of example, each of user systems 102A-102M is shown in FIG. 1 to be communicatively coupled to social network 1 server(s) 104A for the purpose of accessing a site published by a provider of social network 1. Persons skilled in the relevant art(s) will recognize that each of user systems 102A-102M is capable of connecting to any of social network servers 104A-104N for accessing the sites hosted thereon.

Social network servers 104A-104N are computers or other processing systems, each including one or more processors, that are capable of communicating with user systems 102A-102M. Each of social network servers 104A-104N is configured to host a site (e.g., a social network site such as Facebook®, MySpace®, Twitter®, or LinkedIn®, among others) published by a corresponding social network provider so that such site is accessible to users of network 100 via user systems 102A-102M. Each of social network servers 104A-104N is further configured to serve advertisement(s) to users of network 100 when those users access a Web site that is hosted by the respective social network server.

Ad serving system 106 is a computer or other processing system, including one or more processors, that is capable of serving advertisements that are received from advertiser system 108 to each of social network servers 104A-104N when the sites hosted by such servers are accessed by certain users, thereby facilitating the delivery of such advertisements to the users. Ad serving system 106 includes a targeted ad module 110. Targeted ad module 110 is configured to determine whether to provide specified advertisements to users of a social network. The determination for each user is based on a click probability for that user and a social network value for that user. The click probability for a user with respect to an advertisement indicates a likelihood of the user to select that advertisement if the advertisement is provided to the user via the social network. Targeted ad module 110 may determine the social network value of each user as described below.

To determine a social network value for a first user, for example, targeted ad module 110 determines subscription probabilities for respective users of the social network. Targeted ad module 110 then determines the social network value for the first user based on those subscription probabilities. The users include the first user and second users that are included in an affinity set of the first user. For example, targeted ad module 110 may execute one or more ranking algorithms based on the subscription probabilities and strength(s) of respective relationship(s) between the users to determine the social network value. As described above, an affinity set may be any group of persons, including a group of friends, business associates, players of a massively multi-player online game, persons with a common interest, all users of a social network, application ("app"), or web site, or a subgroup thereof. A user may belong to any number of affinity sets.

In one example, targeted ad module 110 may use the subscription probabilities for the respective users as initial scores for a ranking algorithm that assigns weights for each of the relevant users (e.g., the first user and the second users) in the social network. Targeted ad module 110 may then calculate updated scores for all of the relevant users. For instance, targeted ad module 110 may use the ranking algorithm to calculate the updated scores based on the initial scores and a weight assigned to a relationship between each user and other users in the social network. For example, the weight may reflect the number of connections the first user has with other users in the affinity set of the first user. The weight may also reflect the strengths of the respective connections, such as an extent with which the first user communicates with each of the other users. The social network value for the first user may be the updated score for the first user. This and other ways of determining the social network value for the first user are described below.

Targeted ad module 110 may then determine whether to provide the first advertisement to the first user based on the click probability for the first advertisement and the social network value for the first user. For example, targeted ad module 110 may determine a risk value that corresponds to the first advertisement and the first user. The risk value indicates a likelihood of the first advertisement to negatively impact an experience of the first user with respect to him or her using the social network. Targeted ad module 110 may compare the risk value for the first user to a risk threshold. The risk threshold may be applicable to only the first user or to other users of the social network in addition to the first user. If the risk value is less than the risk threshold, then targeted ad module 110 may determine that the first advertisement is to be provided to the first user via the social network. If the risk value is greater than the risk threshold, however, targeted ad module 110 may determine that the first advertisement is not to be provided to the first user. Techniques for determining whether to provide an advertisement to a user of a social network are described in further detail below with reference to FIGS. 2-11.

Advertiser system 108 is a computer or other processing system, including one or more processors, that is capable of providing advertisements to ad serving system 106, so that the advertisements may be served to social network servers 104A-104N when the sites hosted by the respective servers are accessed by certain users. Although one advertiser 108 system is depicted in FIG. 1, persons skilled in the relevant art(s) will recognize that any number of advertiser systems may be communicatively coupled to ad serving system 106.

Although advertiser system 108 and user systems 102A-102M are depicted as desktop computers in FIG. 1, persons skilled in the relevant art(s) will appreciate that advertiser system 108 and user systems 102A-102M may include any browser-enabled system or device, including but not limited to a laptop computer, a tablet computer, a personal digital assistant, a cellular telephone, or the like.

Figure 7:
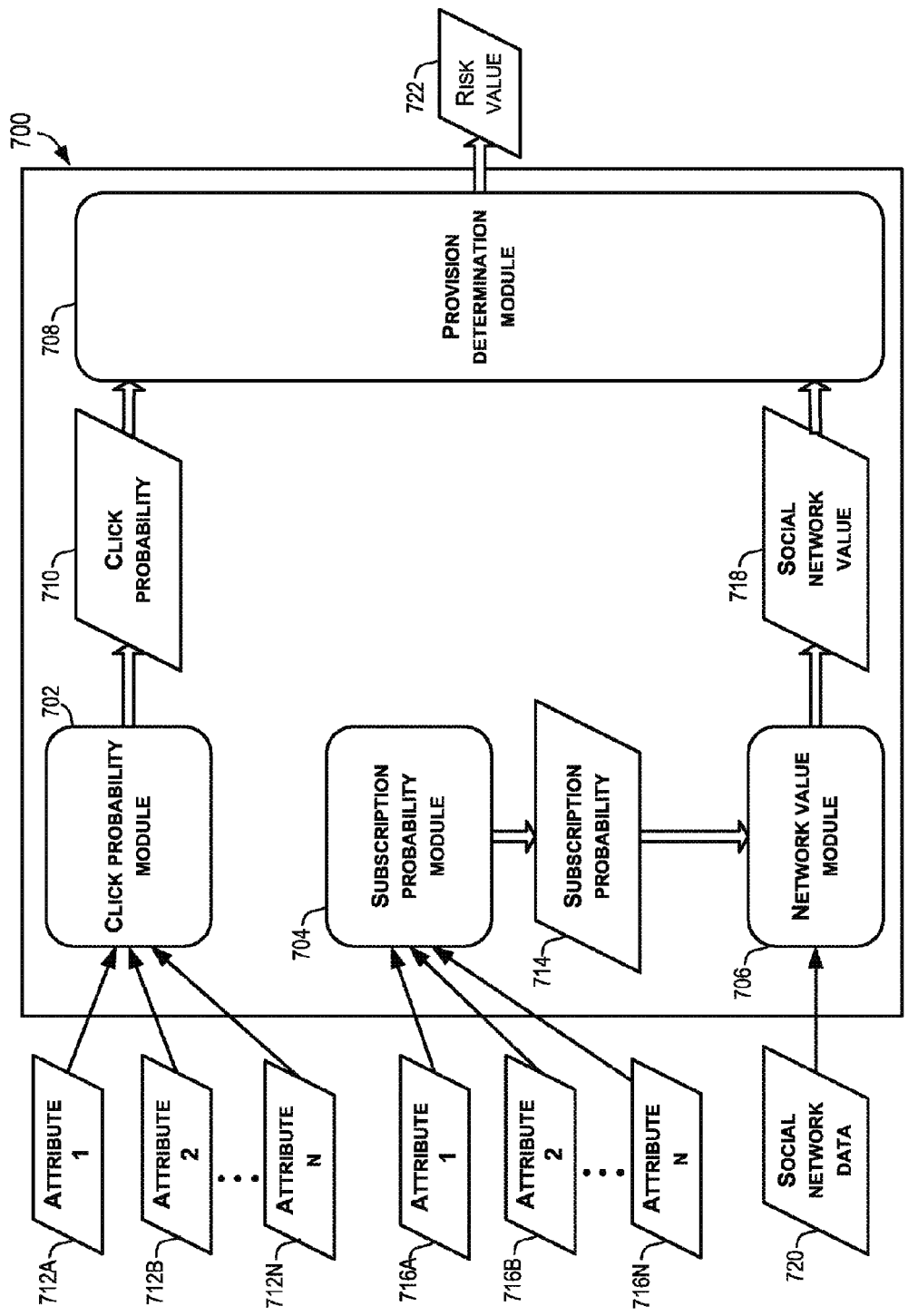
FIG. 7 is a block diagram of an example implementation of a targeted ad module shown in FIG. 1 in accordance with an embodiment described herein.

FIG. 2 depicts a flowchart 200 of an example method for determining whether to provide an advertisement to a user of a social network in accordance with an embodiment described herein. Flowchart 200 may be performed by targeted ad module 110 of display ad network 100 shown in FIG. 1, for example. For illustrative purposes, flowchart 200 is described with respect to a targeted ad module 700 shown in FIG. 7, which is an example of targeted ad module 110, according to an embodiment. As shown in FIG. 7, targeted ad module 700 includes a click probability module 702, a subscription probability module 704, a network value module 706, and a provision determination module 708. Further structural and operational embodiments will be apparent to persons skilled in the relevant art(s) based on the discussion regarding flowchart 200. Flowchart 200 is described as follows.

As shown in FIG. 2, the method of flowchart 200 begins at step 202. In step 202, a click probability for a first user of a social network is determined. The click probability indicates a likelihood of the first user to select (e.g., click on) a first advertisement if the first advertisement is provided to the first user via the social network. In an example implementation, click probability module 702 determines a click probability 710 for the first user of the social network. Click probability module 702 may make the determination based on one or more attributes, such as attributes 712A-712N. Attributes 712A-712N may include user information, ad metadata, publisher metadata, ad context, etc. Attributes 712A-712N may be provided by a search engine (such as Yahoo®, Google®, Bing®, etc.) and/or other sources.

Attributes 712A-712N containing user information may include demographic information that characterizes the first user. For example, if a user is logged into a search engine, the search engine may be able to access a variety of information related to the user based on monitoring and/or logging of the user's activities, characteristics, and/or preferences. For example, such information may include the user's age, gender, and/or recent and long-term search activities (e.g., broken down by time of day, location, and various other criteria), etc. However, even if the user is not logged into the search engine, the search engine may be able to provide some user-related information, though perhaps with less precision than if the user were logged in. In the non-logged in case, the search engine may be able to provide user-related information such as user location (e.g., based on the user's IP address), recent user activity with respect to the search engine (e.g., recent user searches), etc. For example, the search engine may use the recent user activity to create a "behavioral signature" of the user. In accordance with this example, the behavioral signature of the user may indicate that the user is interested in certain topics, such as sports, finance, and/or travel.

Attributes 712A-712N containing ad metadata may characterize the first advertisement. For example, ad metadata may specify the type, topic, content, and other parameters of an ad. In accordance with this example, the ad metadata may specify that the ad is a banner ad, that it is directed to the topic of cars, and that it contains an image. Attributes 712A-712N containing publisher metadata may characterize a publisher of the ad. For example, the publisher information may specify that the ad is published by Yahoo Finance®. Attributes 712A-712N containing ad context may characterize the context of the ad. For example, the ad context may indicate the physical location of the ad on a web page (e.g., from the perspective of the user). In accordance with this example, the ad context for an ad directed to the topic of a football video game may indicate that the ad is embedded in a sports article about football. In this case, the ad context may be indicative of a semantic inference between the ad and its context.

In another example implementation, click probability module 702 uses machine learned rules to determine click probability 710. Click probability module 702 applies the machine learned rules to attributes 712A-712N for the first user and makes a determination regarding a likelihood of the first user to select the first advertisement if the first advertisement is provided to the first user via the social network. Click probability module 702 may learn the machine learned rules using any of a variety of techniques, many of which are well known in the relevant art(s). For example, click probability module 702 may learn the machine learned rules based on historical logs, such as query logs.

It is noted that click probability, as used herein, may be closely related to a click-through rate (CTR). For example, if an ad is shown four times and is selected once by a user, then both the click probability and the CTR are 25% for that ad and that user. The click probability determination for a user may be independent of the subscription probability determination and the social network value determination for that user.

At step 204, a plurality of subscription probabilities are determined for a plurality of respective users of the social network. The plurality of users includes the first user and second users that are included in an affinity set of the first user. Each subscription probability indicates a likelihood of a respective user of the plurality of users to subscribe to a paid service with respect to the social network. In an example implementation, subscription probability module 704 determines a subscription probability 714 for the first user and each of the second users based on one or more attributes, such as attributes 716A-716N.

As mentioned above, in an example implementation, subscription probability module 704 determines a subscription probability 714 for each respective user of the social network based on attributes 716A-716N. The subscription probability determination for a user may be independent of the click probability and/or the social network value for that user. Attributes 716A-716N may include user information, ad metadata, publisher metadata, ad context, etc. Attributes 716A-716N may be provided by a search engine (such as Yahoo®, Google®, Bing®, etc.) and/or other sources.

In some example embodiments, subscription probability module 704 uses machine learned rules to determine the subscription probability (e.g., subscription probability 714) for each user. Subscription probability module 704 applies the machine learned rules to attributes 716A-716N for each respective user and determines a likelihood of each respective user to subscribe to a paid service with respect to the social network.

Subscription probability module 704 may learn the machine learned rules using any of a variety of techniques. Depending on the implementation, the machine learned rules for subscription probability module 704 may be different from or substantially similar to the machine learned rules for click probability module 702. Furthermore, in one example, one or more of attributes 716A-716N may be similar to or the same as one or more of attributes 712A-712N. In another example, attributes 716A-716N and attributes 712A-712N may not include any common attributes.

At step 206, a social network value of the first user is determined based on the plurality of subscription probabilities. In an example implementation, network value module 706 determines a social network value 718 based on a plurality of subscription probabilities 714. For example, network value module 706 may determine social network value 718 by calculating an average (e.g., a weighted average or a non-weighted average) or a median of the plurality of subscription probabilities 714.

In another example implementation, network value module 706 determines social network value 718 for the first user and for the second users based on the plurality of subscription probabilities 714 and social network data 720. For example, network value module 706 may determine social network value 718 based on a weighted average of the plurality of subscription probabilities 714 for the plurality of users. In accordance with this example, the weights that are associated with the respective users may be based on social network data 720. For instance, the weight for the first user may reflect an amount, frequency, and/or quality of communication the first user has with the second users in the affinity set of the first user.

In one example embodiment, network value module 706 determines social network values for respective users of the social network in accordance with a ranking algorithm that accounts for the amount, frequency, and/or quality of communication between the users (i.e., between the first user and the second users in the affinity set of the first user, as well as between the second users). In an example implementation that uses a ranking algorithm, network value module 706 determines social network value 718 of the first user using the ranking algorithm. The weight for each user may be based on an extent with which the first user communicates with each second user. Social network value 718 is determined based on the plurality of subscription probabilities 714 and the plurality of weights. An initial score is assigned to each user based on its respective subscription probability. In accordance with this example implementation, a network value module 800 shown in FIG. 8, which is an example implementation of network value module 706, includes an assignment module 802 that assigns a respective subscription probability as the initial score for each respective user.

In another example embodiment, network value module 706 determines social network value 718 in accordance with a ranking algorithm that accounts for links between users in the social network. A link may be indicative of a relationship between two users in the social network. For instance, a link between two users may be indicative of a first of the two users being a member of an affinity set of a second of the two users. Each link may have an associated weight that reflects the amount, frequency, and/or quality of communication between the two users connected by the respective link. In accordance with this example, a link may have an associated weight that reflects the number of times per week the first of the two users interacts with the second of the two users. Information regarding links between users may be gathered from social network data 720. In an example implementation that uses a ranking algorithm, network value module 706 determines social network value 718 of the first user using the ranking algorithm based on subscription probability 714 and social network data 720.

In accordance with the above example, weights may be assigned for respective links between users. For instance, a first weight may be assigned to a link between a first user and a second user; a second weight may be assigned to a link between the first user and a third user; a third weight may be assigned to a link between the second user and the third user, and so on. The weight for each link may be based on an extent with which the corresponding users communicate. Next, an updated score for each user may be iteratively computed based on the plurality of initial scores and the weights that are assigned for the links to determine social network value 718 for the first user. In an example implementation, network value module 800 shown in FIG. 8 includes an iterative calculation module 804 that iteratively calculates an updated score for each user based on the plurality of initial scores and the weights that are assigned to the links. The updated scores for the respective users (i.e., the first user and the second users) are used to determine social network value 718 for the first user. Example techniques for determining social network values are described below with reference to FIGS. 3, 4, and 7-11.

At step 208, a determination is made whether to provide the first advertisement to the first user based on the click probability and the social network value. Thus, determination of step 208 uses the click probability for the first user for the first advertisement, as determined in step 202, and the social network value for the first user, as determined in step 206. In an example implementation, provision determination module 708 determines whether to provide the first advertisement to the first user based on click probability 710 and social network value 718.

In an example embodiment, the determination that is made at step 208 is based on a risk value regarding the first user and the first advertisement. The risk value indicates a likelihood of the first advertisement to negatively impact an experience of the first user with respect to him or her using the social network. In accordance with this example embodiment, if the risk value is less than a threshold (e.g., a predefined risk threshold), the first advertisement is provided to the first user via the social network. In further accordance with this example embodiment, if the risk value is greater than the threshold, the first advertisement is not provided to the first user via the social network.

In an example embodiment, provision determination module 708 chooses one ad from a plurality of advertisements based on the social network value for the first user and a plurality of click probabilities regarding the plurality of respective advertisements. For example, for a given social network value for the first user, provision determination module 708 selects the advertisement that has the highest click probability from the plurality of advertisements. In an example implementation, provision determination module 708 provides a risk value 722 based on click probability 710 and social network value 718 for the first user. In accordance with this example implementation, provision determination module 708 provides risk value 722 to indicate a likelihood of the first advertisement to negatively impact an experience of the first user with respect to the social network. Provision determination module 708 may use risk value 722 to determine whether to provide the first advertisement to the first user.

In an example embodiment, risk value 722 is a Boolean value of either "TRUE" or "FALSE" indicating whether to provide the first advertisement. For example, provision determination module 708 may determine that the first advertisement is to be provided to the first user if the Boolean value of risk value 722 is "1" or "TRUE." In accordance with this example, provision determination module 708 may determine that the first advertisement is not to be provided to the first user if the Boolean value of risk value 722 is "0" or "FALSE." In another example, provision determination module 708 may determine that the first advertisement is to be provided to the first user if the Boolean value of risk value 722 is "0" or "FALSE." In accordance with this example, provision determination module 708 may determine that the first advertisement is not to be provided to the first user if the Boolean value of risk value 722 is "1" or "TRUE." In another example embodiment, risk value 722 is a numeric value that is compared to a threshold, as described below with reference to FIGS. 5 and 6.

It will be recognized that targeted ad module 700 may not include one or more of click probability module 702, subscription probability module 704, network value module 706, and/or provision determination module 708. Furthermore, targeted ad module 700 may include modules in addition to or in lieu of click probability module 702, subscription probability module 704, network value module 706, and/or provision determination module 708.

Figure 3:
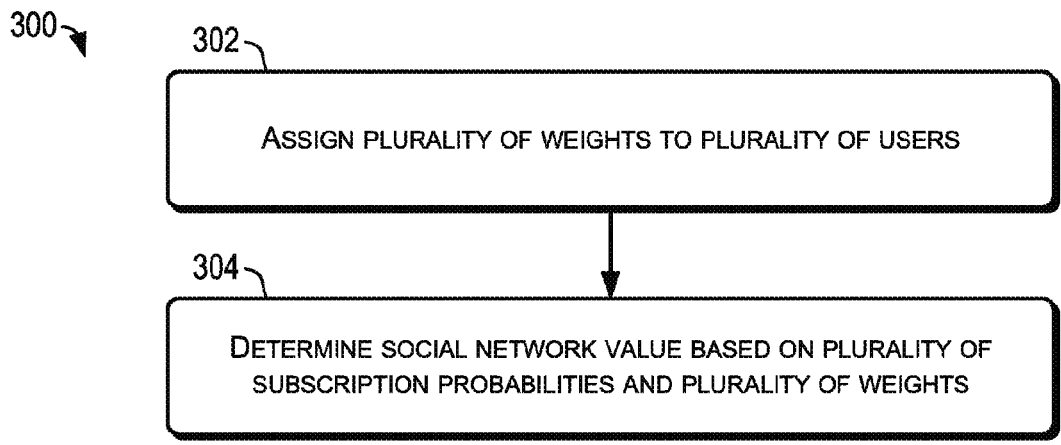
FIGS. 3 and 4 depict flowcharts of example methods for determining a social network value in accordance with embodiments described herein.

In an example embodiment, instead of performing step 206 of flowchart 200, the steps shown in flowchart 300 of FIG. 3 are performed. As shown in FIG. 3, the method of flowchart 300 begins at step 302.

In step 302, a plurality of weights is assigned to the plurality of respective users (i.e., the first users and the second users in the affinity set of the first user). For instance, each weight that is assigned to a user may be based on an extent with which that user communicates with other user(s) in that user's affinity set. In an example implementation, network value module 706 assigns the plurality of weights to the plurality of respective users.

Figure 10:
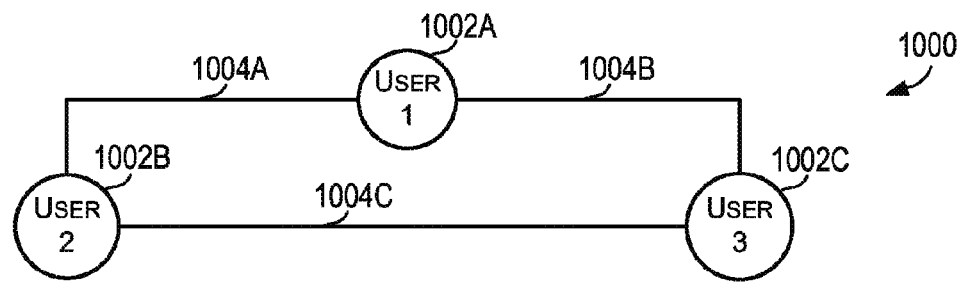
FIGS. 10 and 11 depict example social networks in accordance with embodiments described herein.

Referring to FIG. 10, an example social network 1000 includes a plurality of users 1002A-1002C in accordance with an example embodiment described herein. For illustrative purposes, user 1002A may represent the first user, and users 1002B and 1002C may represent the second users that are included in the affinity set of the first user, as described above with reference to step 302. The weight for the first user (i.e., user 1002A) may be a value that reflects the extent to which user 1002A communicates with the users in its affinity set (i.e., with users 1002B and 1002C). User 1002B may be assigned a weight that represents an extent to which user 1002B communicates with users 1002A and 1002C. User 1002C may be assigned a weight that represents an extent to which user 1002C communicates with users 1002A and 1002B.

Referring back to FIG. 3, in step 304, the social network value is determined based on the plurality of subscription probabilities and the plurality of respective weights. In accordance with the example described above with reference to FIG. 10, each of users 1002A-1002C may have a respective subscription probability (e.g., as determined in step 204) and a respective weight (e.g., as assigned in step 302). In further accordance with this example, the social network value for the first user is determined by using some or all of the subscription probabilities and the respective weights for users 1002A-1002C. In one example embodiment, the determination that is made at step 304 is based on a weighted average of the subscription probabilities for all the respective users. In another example embodiment, a ranking algorithm or some other computation may be used to determine the social network value for the first user.

In another example embodiment, instead of performing step 206 of flowchart 200, the steps shown in flowchart 400 of FIG. are performed. For illustrative purposes, flowchart 400 is described with respect to a network value module 800 shown in FIG. 8, which is an example implementation of network value module 706. Network value module 800 includes an assignment module 802 and an iterative calculation module 804.

Figure 4:
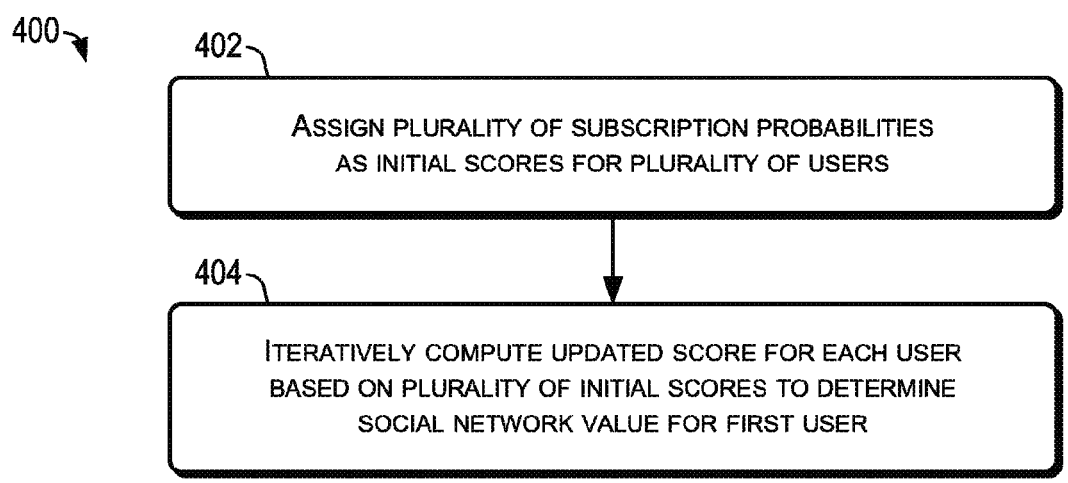

As shown in FIG. 4, the method of flowchart 400 begins at step 402. In step 402, a plurality of subscription probabilities is assigned as a plurality of respective initial scores for the plurality of respective users. In an example implementation, assignment module 802 assigns the plurality of subscription probabilities as the plurality of respective initial scores for the plurality of respective users. Referring to the example social network 1000 of FIG. 10, each of users 1002A-1002C may have an associated subscription probability (e.g., as determined in step 204). The associated subscription probability may be used as an initial score for each of users 1002A-1002C.

At step 404, an updated score is iteratively computed for each of users 1002A-1002C based on the plurality of initial scores to determine the social network value for the first user. In an example implementation, iterative calculation module 804 iteratively computes the updated score for each of users 1002A-1002C based on the plurality of initial scores. In some example embodiments, iterative calculation module 804 iteratively computes the updated score for each user based on links 1004A-1004C between users 1002A-1002C. As shown in FIG. 10, first link 1004A connects user 1002A and user 1002B; second link 1004B connects user 1002A and user 1002C; and third link 1004C connects user 1002B and user 1002C. Link 1004A represents a relationship between users 1002A and 1002B. Link 1004B represents a relationship between users 1002A and 1002C. Link 1004C represents a relationship between users 1002B and 1002C.

As described above with reference to FIG. 2, the relationship between two users being connected by a link may be indicative of a first of the two users being in the affinity set of a second of the two users. Accordingly, link 1004A may indicate that user 1002B is in an affinity set of user 1002A and/or that user 1002A is in an affinity set of user 1002B. Each of links 1004A-1004C may be assigned a weight that represents the extent with which the two connected users communicate (e.g., interact via email, instant messaging, and the like) via the social network. Thus, the weight of first link 1004A may represent the extent with which user 1002A communicates with user 1002B; the weight of second link 1004B may represent the extent with which user 1002A communicates with user 1002C; and the weight of third link 1004C may represent the extent with which user 1002B communicates with user 1002C.

In accordance with this example implementation, iterative calculation module 804 calculates the updated scores for users 1002A-1002C using the initial scores for the users 1002A-1002C and the weights for links 1004A-1004C. For relatively large social networks (e.g., with hundreds, thousands, or millions of users), iterative calculation module 804 may iteratively calculate the updated scores for the respective users until the updated scores substantially converge to fixed scores (e.g., until the scores come to an equilibrium).

For example, the computation of step 404 may use one or more ranking algorithms instead of, or in addition to, the example calculations described above. A ranking algorithm (e.g., a PageRank algorithm, a Hyperlink-Induced Topic Search (HITS) algorithm, a TrustRank algorithm, etc.) may be used to calculate the updated scores for each of users 1002A-1002C. In accordance with this example, the ranking algorithm may use a graph, similar to one shown in FIG. 10 that represents users 1002A-1002C. The plurality of subscription probabilities may be assigned as respective initial scores for each of users 1002A-1002C. A weight may be assigned to each of links 1004A-1004C that represents the extent with which the respective connected users communicate with each other, as described above.

In accordance with this example, iterative calculation module 804 may calculate an updated score for user 1002A that is equal to its previous score (which is the initial score on the first iteration) divided by the number of links from user 1002A to the other users (i.e., users 1002B and 1002C) in the graph corresponding to social network 1000 of FIG. 10. The updated score for user 1002A may be its initial score divided by two, which is the number of links to second users 1002B and 1002C. For relatively large social networks, this calculation may be performed iteratively due to the substantial number of users for which scores are changed. When performing iterative calculations for relatively large social networks, iterative calculation module 804 may calculate eigenvalues for the graph corresponding to the social network. The eigenvalues may be used to calculate the updated scores for the users. Eigenvalues may be calculated using eigenvectors in a modified adjacency matrix of a graph corresponding to the social network, for example.

In the above example, the relationship of the scores for each of the users 1002A-1002C may be indicative of relative importance of each user. In this example, the relative importance of each of users 1002A-1002C may be based on the numeric value of their respective scores. For instance, a relatively higher score may indicate a relatively higher importance; whereas, a relatively lower score may indicate a relatively lower importance. Furthermore, a user with a relatively high initial score in the social network may make other users to which it the user is connected more important, e.g., such that they have a relatively higher final score as calculated using the ranking algorithm.

Figure 11:
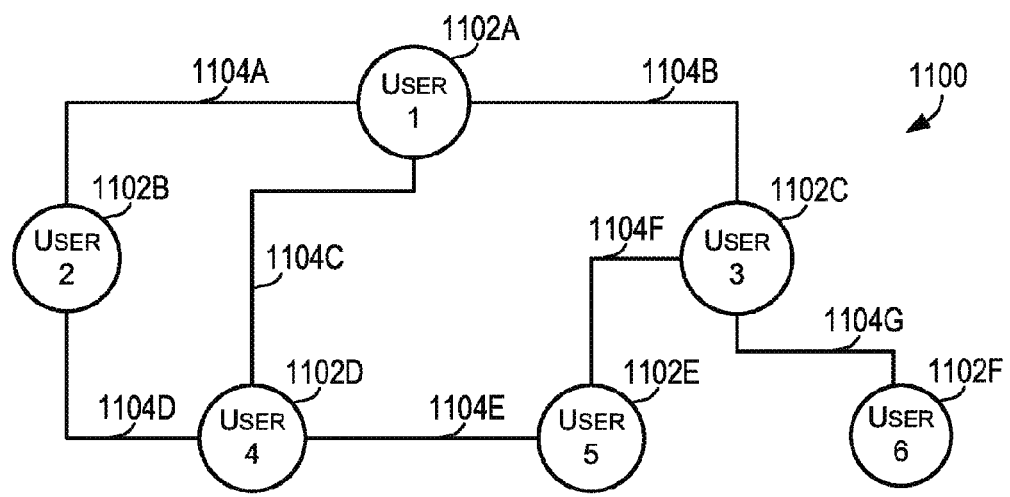

FIG. 11 depicts another example social network 1100 in accordance with an embodiment described herein. Social network 1100 of FIG. 11 will be described with continued reference to social network 1000 of FIG. 10 to show that the number of second users in the affinity set of the first user may not be as important as the relative importance (e.g., score) of each user in the affinity set of the first user. FIG. 11 illustrates six users 1102A-1102F connected by seven communication links 1104A-1104G for illustrative purposes. First user 1002A of social network 1000 has an affinity set that includes two second users 1002B-1002C; whereas first user 1102A of social network 1100 has an affinity set that includes five second users 1102B-1102F. First user 1002A of social network 1000 may have a low subscription probability value, but its second users 1002B-1002C may each subscribe to a premium service for social network 1000. On the other hand, first user 1102A of social network 1100 may already subscribe to a premium service for social network 1100. However, second users 1102B-1102F may each have a very low subscription probability value. As a result, it may be determined that first user 1002A of social network 1000 has a higher social network value than first user 1102A of social network 1100.

Ultimately, the iterative computation at step 404 is used to determine the social network value. In example embodiments using a ranking algorithm, the social network value for the first user is the final score of the first user as computed in accordance with the ranking algorithm. In another example embodiment, the social network value for the first user is a function of the final scores of the users of the social network (i.e., the first user and users in the affinity set of the first user).

Figure 5:
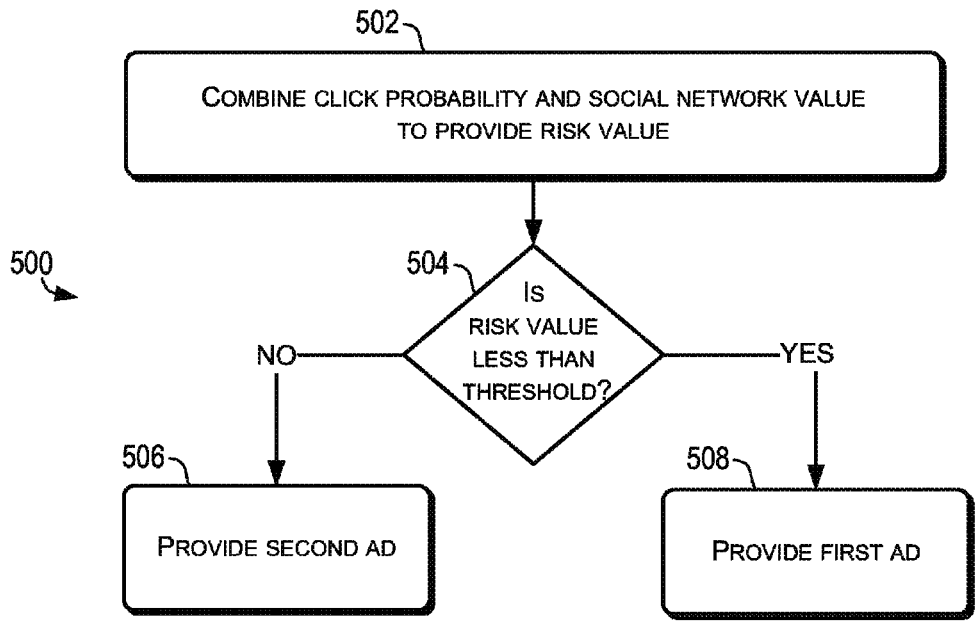
FIGS. 5 and 6 depict flowcharts of example methods for selectively providing advertisements to users of a social network based on a risk value in accordance with embodiments described herein.
Figure 6:
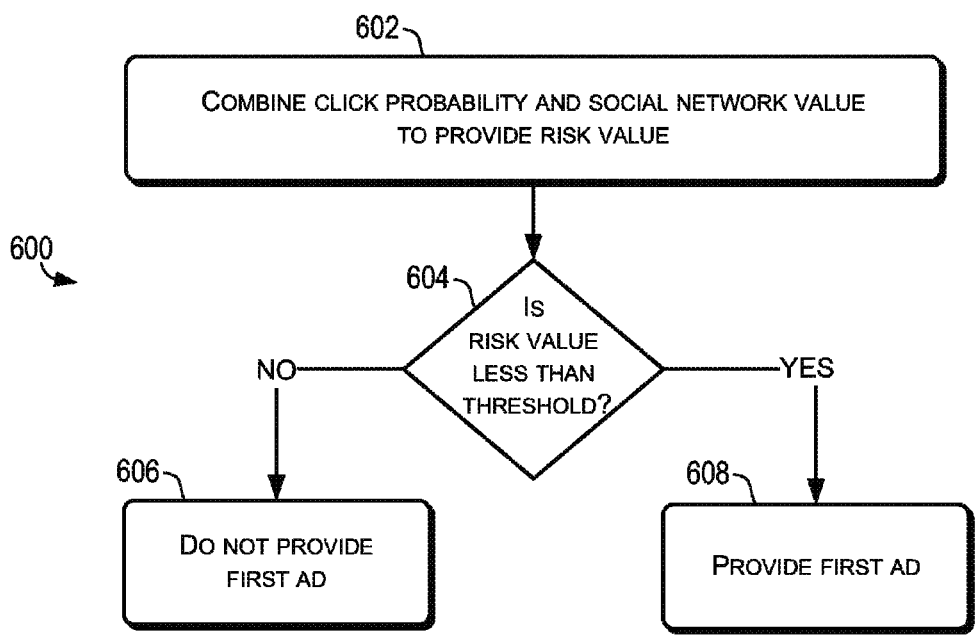

In an example embodiment, instead of performing step 208 of flowchart 200, the steps shown in flowchart 500 of FIG. 5 are performed. In another example embodiment, instead of performing step 208 of flowchart 200, the steps shown in flowchart 600 of FIG. 6 are performed. For illustrative purposes, flowcharts 500 and 600 are described with respect to a provision determination module 900 of FIG. 9, which is an example of provision determination module 708. Provision determination module 900 includes a combination module 902 and a providing module 904.

As shown in FIG. 5, the method of flowchart 500 begins at step 502. In step 502, the click probability and the social network value for the first user are combined to provide a risk value (such as risk value 722 shown in FIG. 7). The risk value indicates a likelihood of the first advertisement to negatively impact an experience of the first user with respect to the social network. In an example implementation, combination module 902 combines the click probability and the social network value for the first user to provide the risk value.

At step 504, a determination is made whether the risk value is less than a threshold. For example, the threshold may be a common threshold that is applicable to all users of the social network. In another example, the threshold may be different for one or more users of the social network depending on factor(s), such as the demographics of the users. The threshold may be a predefined threshold that is determined prior to step 504, though the scope of the example embodiments is not limited in this respect. In an example implementation, providing module 904 determines whether the risk value is less than the threshold. If it is determined that the risk value is less than the threshold, flow continues to step 508. Otherwise, flow continues to step 506.

At step 506, a second advertisement is provided to the first user in lieu of the first advertisement. The second advertisement is different from the first advertisement. For example, the second advertisement may be a different version of the first advertisement. The second advertisement may be determined to have a less negative impact on the experience of the first user with respect to the social network. In an example implementation, providing module 904 provides the second advertisement to the first user.

At step 508, the first advertisement is provided to the first user. In an example implementation, providing module 904 provides the first advertisement to the first user.

As shown in FIG. 6, the method of flowchart 600 begins at step 602. In step 602, the click probability and the social network value for the first user are combined to provide a risk value (such as risk value 722 shown in FIG. 7). In an example implementation, combination module 902 combines the click probability and the social network value for the first user to provide the risk value.

At step 604, a determination is made whether the risk value is less than a threshold (e.g., a predefined threshold). If it is determined that the risk value is less than the threshold, flow continues to step 608. Otherwise, flow continues to step 606.

At step 606, the first advertisement is not provided to the first user. In an example implementation, providing module 904 does not provide the first advertisement to the first user.

At step 608, the first advertisement is provided to the first user. In an example implementation, providing module 904 provides the first advertisement to the first user.

In one example embodiment, instead of using a risk value, provision determination module 900 uses click probability to determine whether to provide the first advertisement, such as by comparing the click probability for the first user to a threshold (e.g., a click probability threshold). For example, provision determination module 900 may determine that the first advertisement is not to be provided to the first user in response to the click probability being less than the threshold. In accordance with this example, provision determination module 900 may determine that the first advertisement is to be provided to the first user in response to the click probability being greater than the threshold. In another example, provision determination module 900 may determine that the first advertisement is not to be provided to the first user in response to the click probability being greater than the threshold. In accordance with this example, provision determination module 900 may determine that the first advertisement is to be provided to the first user in response to the click probability being less than the threshold. In accordance with these examples, providing module 904 may provide the first advertisement to the first user based on a determination that the first advertisement is to be provided to the first user.

In another example embodiment, instead of using a risk value, provision determination module 900 uses the social network value to determine whether to provide the first advertisement, such as by comparing the social network value for the first user to a threshold (e.g., a social network threshold). For example, provision determination module 900 may determine that the first advertisement is not to be provided to the first user in response to the social network value being greater than the threshold. In accordance with this example, provision determination module 900 may determine that the first advertisement is to be provided to the first user in response to the social network value being less than the threshold. In another example, provision determination module 900 may determine that the first advertisement is not to be provided to the first user in response to the social network value being less than the threshold. In accordance with this example, provision determination module 900 may determine that the first advertisement is to be provided to the first user in response to the social network value being greater than the threshold. In accordance with these examples, providing module 904 may provide the first advertisement to the first user based on a determination that the first advertisement is to be provided to the first user.

In yet another example embodiment, provision determination module 900 uses the click probability and social network value to determine whether to provide the first advertisement, such as by comparing the click probability for a first user for a first advertisement to a first threshold (e.g., a click probability threshold) and comparing the social network value for the first user to a second threshold (e.g., a social network value threshold). In accordance with this example embodiment, provision determination module 900 uses a first threshold for the click probability and a second threshold for the social network value. For example, provision determination module 900 may determine that the first advertisement is to be provided to the first user in response to the click probability being greater than the first threshold and further in response to the social network value being less than the second threshold. If provision determination module 900 determines that the click probability is greater than the first threshold and the social network value is less than the second threshold, providing module 904 provides the first advertisement to the first user.

In still another example embodiment, provision determination module 900 uses a function of click probability and social network value to select and provide an advertisement (ad) from a plurality of advertisements. In accordance with this example embodiment, provision determination module 900 uses an ad grid (not shown) to select the ad from the plurality of advertisements. For example, the ad grid may be a two-dimensional array of advertisements in which social network values are represented in a first dimension and click probabilities are represented in a second dimension. In accordance with this example, the advertisements in the ad grid may be organized by ascending social network values in the first dimension and by ascending click probabilities in the second dimension. Each of the plurality of advertisements corresponds to a respective click probability for the first user. For instance, the click probability for each advertisement may be predetermined prior to using the ad grid to select an ad. The social network value for each advertisement in the ad grid may indicate a threshold social network value that the social network value of the first user is not to exceed in order for the respective advertisement to be provided to the first user. Thus, the ad grid may be populated with the plurality of advertisements, each corresponding to a respective click probability and a respective threshold social network value. Provision determination module 900 may use the ad grid to select an ad to be shown to the first user based on the social network value for the first user.

Each advertisement that is included in the ad grid may exhibit a different level of aggressiveness, though the scope of the example embodiments is not limited in this respect. A relatively more aggressive advertisement may have a relatively greater risk of negatively impacting an experience of a user if that advertisement is provided to the user, but the advertisement may have a relatively greater chance of being more profitable to the ad publisher and/or the social network. Accordingly, the relatively more aggressive advertisement may have a greater threshold social network value than a relatively less aggressive advertisement. In other words, the more aggressive ad may be shown to users with a greater social network value (e.g., users with a social network value that exceeds the threshold social network value of the relatively less aggressive advertisement).

In accordance with an embodiment, provision determination module 900 selects an ad from the ad grid that has a threshold social network value that matches (e.g., is the closest to without being less than) the social network value for the first user. It may be possible that several advertisements have respective threshold social network values that match the social network value of the first user. In this case, provision determination module 900 may select the advertisement that has the highest click probability from those advertisements, though it will be recognized that other selecting criteria may be used in addition to, or lieu of, the highest click probability.

Targeted ad module 110, click probability module 702, subscription probability module 704, network value module 706, provision determination module 708, assignment module 802, iterative calculation module 804, combination module 902 and providing module 904 may be implemented in hardware, software, firmware, or any combination thereof.

For example, targeted ad module 110, click probability module 702, subscription probability module 704, network value module 706, provision determination module 708, assignment module 802, iterative calculation module 804, combination module 902 and/or providing module 904 may be implemented as computer program code configured to be executed in one or more processors.

In another example, targeted ad module 110, click probability module 702, subscription probability module 704, network value module 706, provision determination module 708, assignment module 802, iterative calculation module 804, combination module 902 and/or providing module 904 may be implemented as hardware logic/electrical circuitry.

III. Example Computer Implementation

Figure 12:
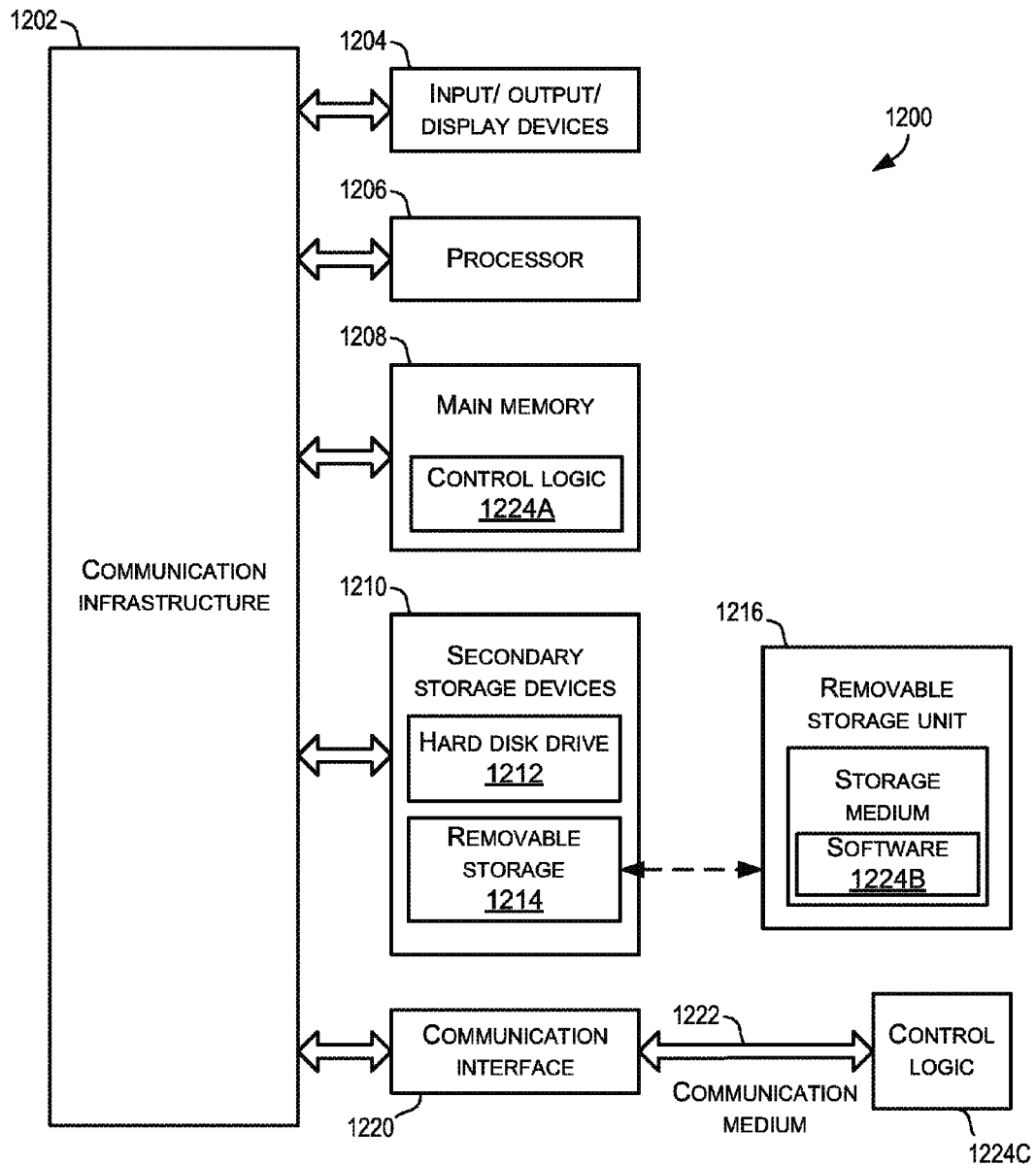
FIG. 12 is a block diagram of a computer in which embodiments may be implemented.

The embodiments described herein, including systems, methods/processes, and/or apparatuses, may be implemented using well known servers/computers, such as computer 1200 shown in FIG. 12. For instance, elements of example display ad network 100, including any of the user systems 102A-102M, any of the servers 104A-104N, advertiser system 108, and ad serving system 106 depicted in FIG. 1 and elements thereof, each of the steps of flowchart 200 depicted in FIG. 2, each of the steps of flowchart 300 depicted in FIG. 3, each of the steps of flowchart 400 depicted in FIG. 4, each of the steps of flowchart 500 depicted in FIG. 5, and each of the steps of flowchart 600 depicted in FIG. 6 can each be implemented using one or more computers 1200.

Computer 1200 can be any commercially available and well known computer capable of performing the functions described herein, such as computers available from International Business Machines, Apple, Sun, HP, Dell, Cray, etc. Computer 600 may be any type of computer, including a desktop computer, a server, etc.

As shown in FIG. 12, computer 1200 includes one or more processors (e.g., central processing units (CPUs)), such as processor 1206. Processor 1206 may include targeted ad module 110 of FIG. 1; click probability module 702, subscription probability module 704, network value module 706, and/or provision determination module 708 of FIG. 7; assignment module 802 and/or iterative calculation module 804 of FIG. 8; combination module 902 and/or providing module 904 of FIG. 9; and/or any portion or combination thereof, for example, though the scope of the embodiments is not limited in this respect. Processor 1206 is connected to a communication infrastructure 1202, such as a communication bus. In some embodiments, processor 1206 can simultaneously operate multiple computing threads.

Computer 1200 also includes a primary or main memory 1208, such as a random access memory (RAM). Main memory has stored therein control logic 1224A (computer software), and data.

Computer 1200 also includes one or more secondary storage devices 1210. Secondary storage devices 1210 include, for example, a hard disk drive 1212 and/or a removable storage device or drive 1214, as well as other types of storage devices, such as memory cards and memory sticks. For instance, computer 1200 may include an industry standard interface, such as a universal serial bus (USB) interface for interfacing with devices such as a memory stick. Removable storage drive 1214 represents a floppy disk drive, a magnetic tape drive, a compact disk drive, an optical storage device, tape backup, etc.

Removable storage drive 1214 interacts with a removable storage unit 1216. Removable storage unit 1216 includes a computer useable or readable storage medium 1218 having stored therein computer software 1224B (control logic) and/or data. Removable storage unit 1216 represents a floppy disk, magnetic tape, compact disc (CD), digital versatile disc (DVD), Blue-ray disc, optical storage disk, memory stick, memory card, or any other computer data storage device. Removable storage drive 1214 reads from and/or writes to removable storage unit 1216 in a well known manner.

Computer 1200 also includes input/output/display devices 1204, such as monitors, keyboards, pointing devices, etc.

Computer 1200 further includes a communication or network interface 1220. Communication interface 1220 enables computer 1200 to communicate with remote devices. For example, communication interface 1220 allows computer 1200 to communicate over communication networks or mediums 1222 (representing a form of a computer useable or readable medium), such as local area networks (LANs), wide area networks (WANs), the Internet, etc. Network interface 1220 may interface with remote sites or networks via wired or wireless connections. Examples of communication interface 1222 include but are not limited to a modem, a network interface card (e.g., an Ethernet card), a communication port, a Personal Computer Memory Card International Association (PCMCIA) card, etc.

Control logic 1224C may be transmitted to and from computer 1200 via the communication medium 1222.

Any apparatus or manufacture comprising a computer useable or readable medium having control logic (software) stored therein is referred to herein as a computer program product or program storage device. This includes, but is not limited to, computer 1200, main memory 1208, secondary storage devices 1210, and removable storage unit 1216. Such computer program products, having control logic stored therein that, when executed by one or more data processing devices, cause such data processing devices to operate as described herein, represent embodiments of the invention.

Figure 8:
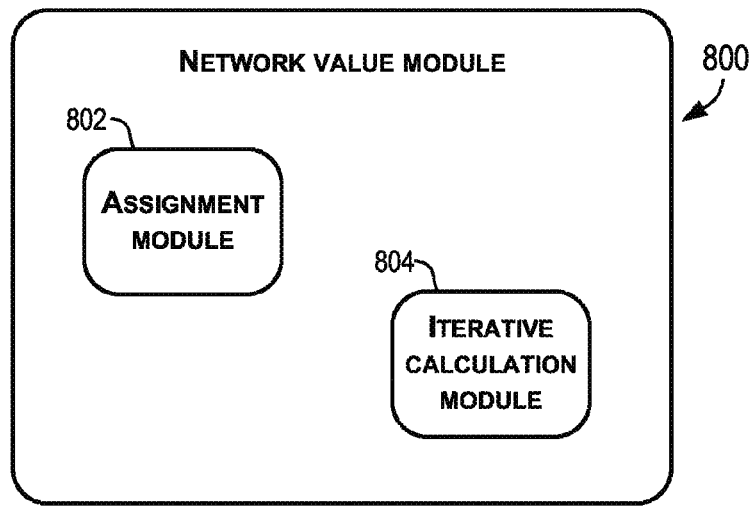
FIG. 8 is a block diagram of an example implementation of a network value module shown in FIG. 7 in accordance with an embodiment described herein.
Figure 9:
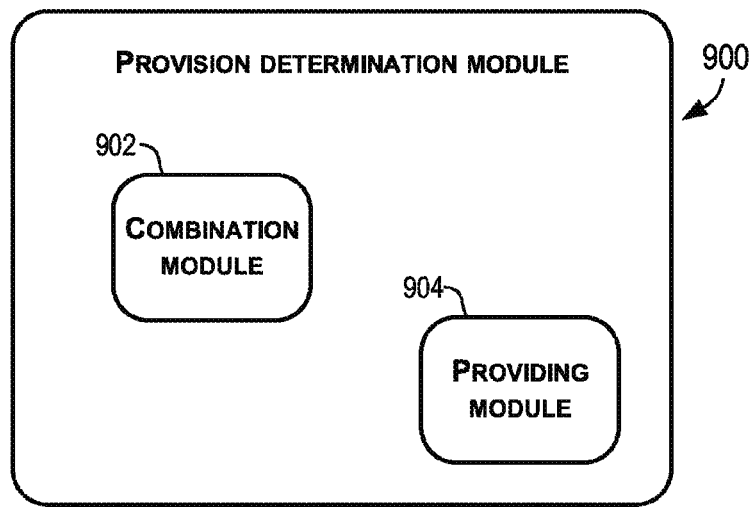
FIG. 9 is a block diagram of an example implementation of a provision determination module shown in FIG. 7 in accordance with an embodiment described herein.

For example, each of the elements of targeted ad module 110 depicted in FIG. 1; click probability module 702, subscription probability module 704, network value module 706, and provision determination module 708, each depicted in FIG. 7; assignment module 802 and iterative calculation module 804, each depicted in FIG. 8; combination module 902 and providing module 904, each depicted in FIG. 9; each of the steps of flowchart 200 depicted in FIG. 2; each of the steps of flowchart 300 depicted in FIG. 3; each of the steps of flowchart 400 depicted in FIG. 4; each of the steps of flowchart 500 depicted in FIG. 5; and each of the steps of flowchart 600 depicted in FIG. 6 can be implemented as control logic that may be stored on a computer useable medium or computer readable medium, which can be executed by one or more processors to operate as described herein.

IV. Conclusion

While various embodiments have been described above, it should be understood that they have been presented by way of example only, and not limitation. It will be apparent to persons skilled in the relevant art(s) that various changes in form and details can be made therein without departing from the spirit and scope of the invention. Thus, the breadth and scope of the present invention should not be limited by any of the above-described example embodiments, but should be defined only in accordance with the following claims and their equivalents.

What is claimed is:

1. A method comprising:
   determining a click probability for a first user of a social network using at least one processor, the click probability indicating a likelihood of the first user to select a first advertisement if the first advertisement is provided to the first user via the social network;
   determining a plurality of subscription probabilities for a plurality of respective users of the social network, the plurality of users including the first user and second users that are included in an affinity set of the first user, each subscription probability indicating a likelihood of a respective user of the plurality of users to subscribe to a paid service with respect to the social network;
   determining a social network value for the first user based on the plurality of subscription probabilities; and
   determining whether to provide the first advertisement to the first user based on the click probability and the social network value.

2. The method of claim 1, further comprising:
   assigning a plurality of weights to the plurality of respective users;
   wherein determining the social network value comprises:
      determining the social network value based on the plurality of subscription probabilities and the plurality of respective weights.

3. The method of claim 2, wherein each weight that is assigned to a second user is based on an extent with which the first user communicates with that second user.

4. The method of claim 1, wherein determining whether to provide the first advertisement comprises:
   combining the click probability and the social network value to provide a risk value that indicates a likelihood of the first advertisement to negatively impact an experience of the first user with respect to the social network; and
   wherein the method further comprises:
   if the risk value is less than a risk threshold, providing the first advertisement to the first user; and
   if the risk value is greater than risk threshold, providing a second advertisement in lieu of the first advertisement to the first user.

5. The method of claim 1, wherein determining whether to provide the first advertisement to the first user comprises:
   combining the click probability and the social network value to provide a risk value that indicates a likelihood of the first advertisement to negatively impact an experience of the first user with respect to the social network; and wherein the method further comprises:
if the risk value is less than a risk threshold, providing the first advertisement to the first user; and
if the risk value is greater than the risk threshold, not providing the first advertisement to the first user.

6. The method of claim 1, wherein determining the click probability for the first user comprises:
applying a plurality of machine learned rules to a plurality of attributes of one or more of the first user, the first advertisement, or the social network to determine the click probability.

7. The method of claim 1, wherein determining the plurality of subscription probabilities comprises:
applying a plurality of machine learned rules to a plurality of attributes of each user of the plurality of users to determine the plurality of respective subscription probabilities.

8. The method of claim 1, wherein determining the social network value comprises:
assigning the plurality of subscription probabilities as a plurality of respective initial scores for the plurality of respective users; and
iteratively calculating an updated score for each user in the plurality of users based on the plurality of initial scores to determine the social network value for the first user.

9. The method of claim 8, wherein iteratively calculating the updated score for each user in the plurality of users is performed until the updated scores for the respective users substantially converge to respective fixed scores.

10. The method of claim 1, wherein determining whether to provide the first advertisement comprises:
determining that the first advertisement is to be provided to the first user in response to the click probability being greater than a first threshold and the social network value being less than a second threshold.

11. The method of claim 1, wherein determining whether to provide the first advertisement comprises:
determining that the first advertisement is not to be provided to the first user in response to the click probability being less than a threshold.

12. The method of claim 1, wherein determining whether to provide the first advertisement comprises:
determining that the first advertisement is not to be provided to the first user in response to the social network value being greater than a threshold.

13. A system comprising:
one or more processors,
a click probability module, implemented using at least one of the one or more processors, configured to determine a click probability for a first user of a social network, the click probability indicating a likelihood of the first user to select a first advertisement if the first advertisement is provided to the user via the social network;
a subscription probability module, implemented using at least one of the one or more processors, configured to determine a plurality of subscription probabilities for a plurality of respective users of the social network, the plurality of users including the first user and second users that are included in an affinity set of the first user, each subscription probability indicating a likelihood of a respective user of the plurality of users to subscribe to a paid service with respect to the social network;
a network value module, implemented using at least one of the one or more processors, configured to determine a social network value for the first user based on the plurality of subscription probabilities; and
a provision determination module, implemented using at least one of the one or more processors, configured to determine whether to provide the first advertisement to the first user based on the click probability and the social network value.

14. The system of claim 13, further comprising:
an assignment module configured to assign a plurality of weights to the plurality of respective users;
wherein the network value module is configured to determine the social network value based on the plurality of subscription probabilities and the plurality of respective weights.

15. The system of claim 14, wherein each weight that is assigned to a second user is based on an extent with which the first user communicates with that second user.

16. The system of claim 13, wherein the provision determination module comprises:
a combination module configured to combine the click probability and the social network value to provide a risk value that indicates a likelihood of the first advertisement to negatively impact an experience of the first user with respect to the social network; and
a providing module configured to provide the first advertisement to the first user if the risk value is less than a risk threshold, the providing module further configured to not provide the first advertisement to the first user if the risk value is greater than the risk threshold.

17. The system of claim 13, wherein the click probability module is configured to apply a plurality of machine learned rules to a plurality of attributes of one or more of the first user, the first advertisement, or the social network to determine the click probability.

18. The system of claim 13, wherein the subscription probability module is configured to apply a plurality of machine learned rules to a plurality of attributes of each user of the plurality of users to determine the plurality of respective subscription probabilities.

19. The system of claim 13, wherein the network value module comprises:
an assignment module configured to assign the plurality of subscription probabilities as a plurality of respective initial scores for the plurality of respective users; and
an iterative calculation module configured to iteratively calculate an updated score for each user in the plurality of users based on the plurality of initial scores to determine the social network value for the first user.

20. A computer program product comprising a non-transitory computer-readable medium having computer program logic recorded thereon for enabling a processor-based system to provide targeted advertising in a social networking computer system, comprising:
a first program logic module for enabling the processor-based system to determine a click probability for a first user of a social network, the click probability indicating a likelihood of the first user to select a first advertisement if the first advertisement is provided to the first user via the social network;
a second program logic module for enabling the processor-based system to determine a plurality of subscription probabilities for a plurality of respective users of the social network, the plurality of users including the first user and second users that are included in an affinity set of the first user, each subscription probability indicating a likelihood of a respective user of the plurality of users to subscribe to a paid service with respect to the social network;

a third program logic module for enabling the processor-based system to determine a social network value for the first user based on the plurality of subscription probabilities; and a fourth program logic module for enabling the processor-based system to determine whether to provide the first advertisement to the first user based on the click probability and the social network value.

\* \* \* \* \*